US006893176B2

(12) United States Patent
Obara

(10) Patent No.: US 6,893,176 B2
(45) Date of Patent: May 17, 2005

(54) LABEL PRINTER FOR OPTICAL DISK SUCH AS CD

(75) Inventor: Daisuke Obara, Osaka (JP)

(73) Assignee: Orient Instrument Computer Co., Ltd., Osaka (JP)

( * ) Notice: Subject to any disclaimer, the term of this patent is extended or adjusted under 35 U.S.C. 154(b) by 0 days.

(21) Appl. No.: 10/479,278

(22) PCT Filed: May 31, 2001

(86) PCT No.: PCT/JP01/04620

§ 371 (c)(1),
(2), (4) Date: Dec. 1, 2003

(87) PCT Pub. No.: WO02/098668

PCT Pub. Date: Dec. 12, 2002

(65) Prior Publication Data

US 2004/0141791 A1 Jul. 22, 2004

(51) Int. Cl.[7] .......................... B41J 13/12; B41J 3/407; G11B 17/022

(52) U.S. Cl. .......................... 400/693; 400/48; 101/35; 101/474

(58) Field of Search ............................ 400/48, 23, 578, 400/691, 692, 693, 622, 623; 369/77.11, 289.1, 77.1, 289; 101/35, 41, 407.1, 474

(56) References Cited

U.S. PATENT DOCUMENTS 6,580,444 B1 * 6/2003 Drynkin et al. ............. 347/171
6,767,148 B2 * 7/2004 Murata ....................... 400/578

FOREIGN PATENT DOCUMENTS

JP 07098953 A 4/1995
JP 3053437 U 8/1998
JP 2000-11573 * 1/2000
KR 2003-086071 A * 11/2003

* cited by examiner

*Primary Examiner*—Leslie J. Evanisko
(74) *Attorney, Agent, or Firm*—Watchstone P & D; Stephen B. Parker

(57) ABSTRACT

A label printer suitable for label printing of a name card type optical disk as well as a 12 cm-standard complete round disk, wherein a 12 cm-diameter complete round disk loading recessed portion 3 is provided in a disk transferring tray 2 allowed to be inserted and ejected from a printer body 1, and a name card type disk loading recessed portion 4 having a bottom surface positioned lower than the bottom surface of the complete round disk loading recessed portion 3 is provided at the rear portion of the complete round disk loading recessed portion 3. At a rear portion of the name card type disk loading recessed portion 4, an aperture for allowing the movement of the tip protruded portion 11*a* of a disk holding means 11 in the fore-and-aft direction of the printer body 1 is provided. When the disk transferring tray 2 is ejected from the printer body 1, a 12 cm-diameter complete disk D1 or a name card disk D2 is loaded in the corresponding disk loading recessed portion 3, 4 and then the disk transferring tray 2 is inserted in the printer body 1, the 12 cm-diameter complete disk D1 or the name card type disk D2 is pressed against the inner periphery of the corresponding disk loading recessed portion 3, 4 to be immovably held. Therefore, an excellent label printing with no blur can be performed.

19 Claims, 10 Drawing Sheets

LABEL PRINTER FOR OPTICAL DISK SUCH AS CD

TECHNICAL FIELD

The present invention relates to a label printer for performing label printing of an optical disk such as the so-called CD, DVD, etc., and more particularly to a label printer preferably used for label printing of a name card type optical disk as well as a standard 12 cm-diameter complete round disk.

BACKGROUND ART

Recently, the so-called compact disks (hereinafter referred to as "CD(s)," which will be referred to as a generic term of various CDs including not only the so-called music CD but also CD-ROM, CD-R, CD-RW, etc.) among optical disks that have become essential as information recording mediums have been widely used.

For example, a CD-ROM exclusively used for reading recorded information is manufactured via a creation of the so-called metal master, a creation of a metal mother as a backup of the metal master, a creation of a stamper, a stamping with the stamper, a creation of a reflection layer, a formation of a protective layer on the reflection layer and label printing.

These manufacturing processes are reasonable from the aspect of cost performance in cases where a large number of CD-ROMs are manufactured at once, but may come in extremely high cost in cases where several tens of or two or three hundreds of CD-ROMs are manufactured.

Therefore, in cases where a small number of CD-ROMs are manufactured, the following method is employed. In the method, a copying machine connected to a personal computer is used, and the recorded information source from the personal computer is copied onto a non-recorded recordable CD-R loaded on the copying machine. In order to perform label printing of the CD-R on which the recorded information was copied, a label printer is used.

In practice, this label printer is connected to the copying machine. This copying machine is not a simple copying machine, and a commercially available machine (hereinafter referred to as "automatic machine") equipped with a hand arm that continuously and automatically performs a series of operations including the loading of a CD-R to the copying machine, the unloading of the recorded CD-R after the completion of recording information (essentially, CD-ROM), the loading of the recorded CD-R to the label printer, the unloading of the printed CD-R, and the accumulation of the unloaded CD-Rs.

Although the detailed explanation of this copying machine is omitted since such explanation is not the purpose of this specification, the outline of the label printer will be explained based on FIGS. 9 and 10 as follows. A disk transferring tray 53 is mounted on the printer body 52 of the label printer 51 in an insertable and ejectable manner, and the printer body 52 is provided with ink heads (not shown) therein. FIG. 9 is a schematic plan view showing the state in which the disk transferring tray 53 is ejected from the printer body 52, and FIG. 10 is a schematic plan showing the state in which the disk transferring tray 53 is inserted in the printer body 52 with the disk D1 loaded thereon.

The disk transferring tray 53 is provided with a disk loading recessed portion 54 having a size capable of loading a 12 cm-CD with a slight margin therearound approximately at a longitudinal central portion of the tray or a middle portion of the tray in the fore-and-aft direction of the printer body 52. When the disk transferring tray 53 is inserted into the printer body 52 with a disk D1 loaded in the disk loading recessed portion 54, the disk holding member 55 as a disk holding means equipped to the disk transferring tray 53 is activated. Thus, the tip protruded portion 55*a* of the disk holding member 55 moves along the guide aperture 56 formed from the rear portion of the disk loading recessed portion 54 to the rear end portion to press the disk D1 against the front end portion of the disk loading recessed portion 54. Essentially, the peripheral portion of the disk is slightly slipped under the right-and-left pair of holding claws 60 and 60 to be pressed by the lower surfaces of the holding claws 60 and 60.

Thus, the disk D1 is held in the disk loading recessed portion 54 in an immovable manner, whereby the printing of the disk with an ink head can be executed accurately at the time of performing the printing in the printer body 52. After the completion of the printing, the disk transferring tray 53 is automatically ejected from the printer body 52. In the case of the aforementioned automatic machine, the hand arm picks up the disk D1 from the disk transferring tray 53. In the case of a manual operation, the unloading of the disk D1 can be performed smoothly by inserting a finger into the finger insertion aperture 59 provided at the center of the disk loading recessed portion 54 from beneath the disk transferring tray 53 and slightly pushing up the disk D1.

In figures, the reference numeral 58 denotes a window for a sensor provided in the printer body to discriminate whether a disk is loaded at the time of inserting the tray, and the reference numeral 57 denotes a die hole indispensable to form the holding claws 60 and 60.

Although the label printer 51 can be preferably used for a label printing of a standard 12 cm-CD, the printer cannot be used for a label printing of a name card type (card type) CD which has recently become available to the market as it is.

Of course, in performing label printing of a name card type (card type) CD, it is possible to employ a name card type disk adapter disclosed by, for example, Japanese Unexamined Laid-open Patent Publication 2000-11573 A and make the aforementioned label printer execute the label printing of a name card type CD with the name card type disk adapter mounting a CD loaded in the disk loading recessed portion 54.

However, in order to mount a CD to such a disk adapter, it is required to operate engaging means such as engaging claws formed on the disk adapter. Although each operation is generally simple, in a case where there are tens or hundreds of CDs, the operations of mounting a CD on the adapter, removing the CD from the adapter after the completion of the label printing and then mounting another new CD on the adapter are troublesome. More importantly, such an adapter cannot be used in the aforementioned automatic machine that automatically performs from copies of CDs to label printing of CDs.

The present invention was made under the aforementioned technical background and aims to provide a label printer for optical disks such as CDs capable of automatically holding a name card type optical disk in an immovable manner at a printing position when a disk transferring tray is inserted in a printer body with the name card type optical disk placed at a predetermined position on the disk transferring tray without using an adapter to thereby perform a predetermined label printing.

DISCLOSURE OF INVENTION

In order to attain the aforementioned object, in the present invention, in addition to a 12 cm-diameter complete round disk loading recessed portion, a name card type disk loading recessed portion is formed on a disk transferring tray so as to immovably hold the name card type disk in the name card type disk loading recessed portion.

That is, according to the present invention, a label printer for an optical disk such as a CD, comprises a disk transferring tray with a 12 cm-diameter complete round disk loading recessed portion, the disk transferring tray being able to be inserted into and ejected from a printer body, and a disk holding means that holds an optical disk such as a CD in the 12 cm-diameter complete round disk loading recessed portion by pressing the optical disk, characterized in that a name card type disk loading recessed portion is formed in the tray, and a name card type disk loaded in the name card type disk loading recessed portion is pressed against an inner periphery of the name card type disk loading recessed portion by a disk holding means to immovably hold the disk.

According to the present invention, as a matter of course that label printing of a 12 cm-diameter complete round disk can be performed. Furthermore, since a name card type disk loaded in the name card type disk loading recessed portion is pressed against the inner periphery of the name card type disk loading recessed portion by the disk holding means to thereby immovably hold the disk, a preferable label printing of a name card type disk can be performed.

In the same manner as in a conventional label printer, it is preferable that the disk holding means moves in accordance with the movement of the disk transferring tray in a disk releasing direction when the disk transferring tray is ejected from the printer body and in a disk holding direction when the disk transferring tray is inserted into the printer body.

Furthermore, it is preferable that the disk holding means serves both as a disk holding means for holding the name card type disk in the name card type disk loading recessed portion and a disk holding means for holding a 12 cm-diameter complete round disk in the 12 cm-diameter complete round disk loading recessed portion. In this case, it is possible to avoid an increase of the number of parts and the structural complexity due to separate pieces and simplify the interlocking mechanism with the disk transferring tray.

It is preferable that the name card type disk loading recessed portion is formed at a rear portion of the complete round disk loading recessed portion and that a bottom surface of the recessed portion is positioned lower than a bottom surface of the complete round disk loading recessed portion. In this case, the disk transferring tray can be approximately the same size as a disk transferring tray of a conventional label printer, preventing an increase of the size of the disk transferring tray, which in turn can prevent an increase of the size of the label printer.

It is preferable that the name card type disk loading recessed portion is formed into an approximately rectangular shape as seen from the above corresponding to a plan shape of a name card type optical disk and that the rear end edge is positioned in the vicinity of a rear most portion of a virtual complete circle of the complete round disk loading recessed portion. In this case, the holding position of the disk holding means against the complete round disk and that against the name card type disk can be set to be the same or almost the same, which makes the holding force of the disk holding means against the name card type disk and the complete round disk almost constant. This prevents excessive or insufficient holding of either disk. Furthermore, since the movable region of the ink head in the printer body can be the same as a conventional label printer or slightly larger, the basic structure of a conventional label printer can be used as it is.

Furthermore, it is preferable that the name card type disk loading recessed portion is formed such that a long side thereof crosses in a transferring direction of the disk transferring tray. In this case, a name card type disk can be held in the widthwise direction, which reduces the warping of a name card type disk due to the holding as compared with the case in which the disk is held in the longitudinal direction. Furthermore, since the degree of occupation of the name card type disk loading recessed portion to the complete round disk loading recessed portion can be minimized, the printing on a 12 cm-diameter disk by a printer head can be stabilized.

It is preferable that a disk ejecting finger insertion aperture communicating with the name card type disk loading recessed portion is formed in the complete round disk loading recessed portion. In this case, in cases where a name card type disk is loaded on the disk transferring tray or unloaded therefrom, the name card type disk can be easily unloaded. Although the position of the aperture is not limited to a specific position, it is preferable to set the position at a position corresponding to the central aperture of the disk because printing by the ink head is not performed at the position.

It is preferable that a disk ejecting finger insertion aperture communicating with the complete round disk loading recessed portion is formed in the vicinity of a periphery of the complete round disk loading recessed portion in order to facilitate the unloading of the complete round disk from the complete round disk loading recessed portion like the name card type disk.

BEST MODE FOR CARRYING OUT THE INVENTION

Hereinafter, a best mode for carrying out the invention will be explained with reference to drawings.

Figure 1:
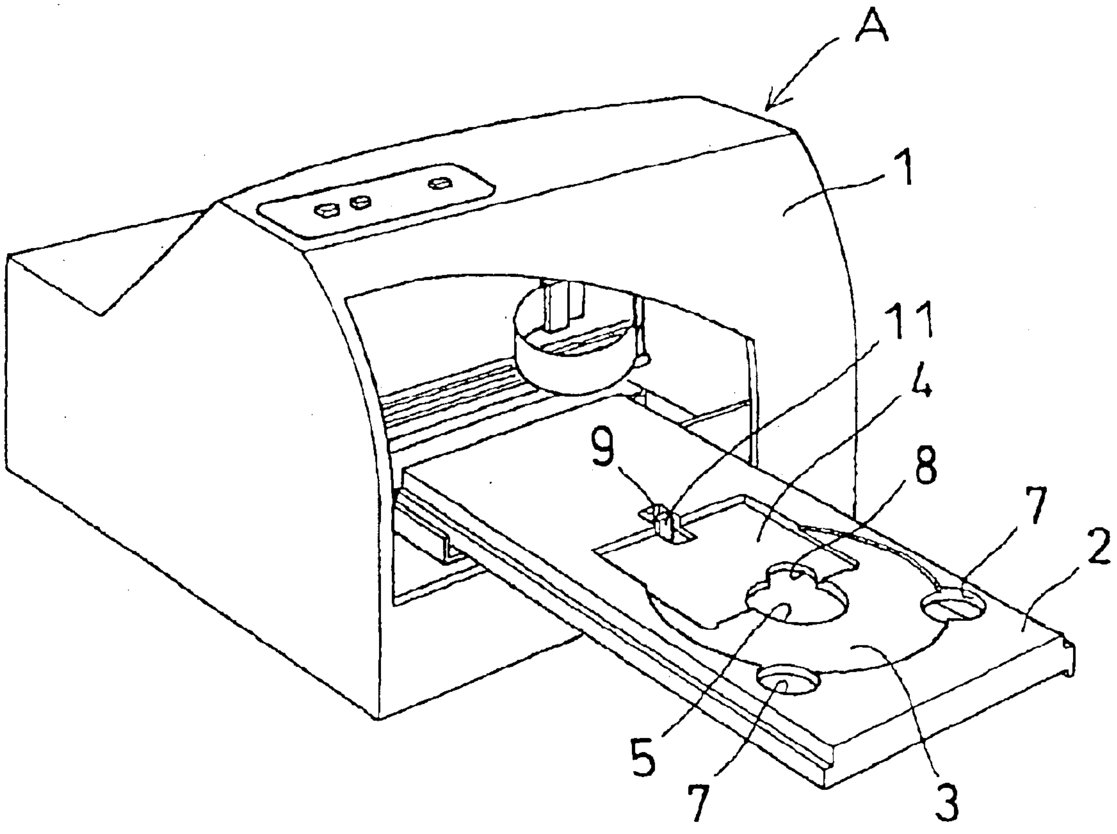
FIG. 1 is a perspective view showing an embodiment of the present invention.

FIG. 1 is a perspective view showing the state in which a disk transferring tray 2 is ejected from a printer body 1 of a label printer A according to the present invention. The disk transferring tray 2 is in an empty state in which no disk is loaded in either recessed portions 3 and 4, the 12 cm-diameter complete around disk loading recessed portion 3 or the name card type disk loading recessed portion 4.

Figure 2:
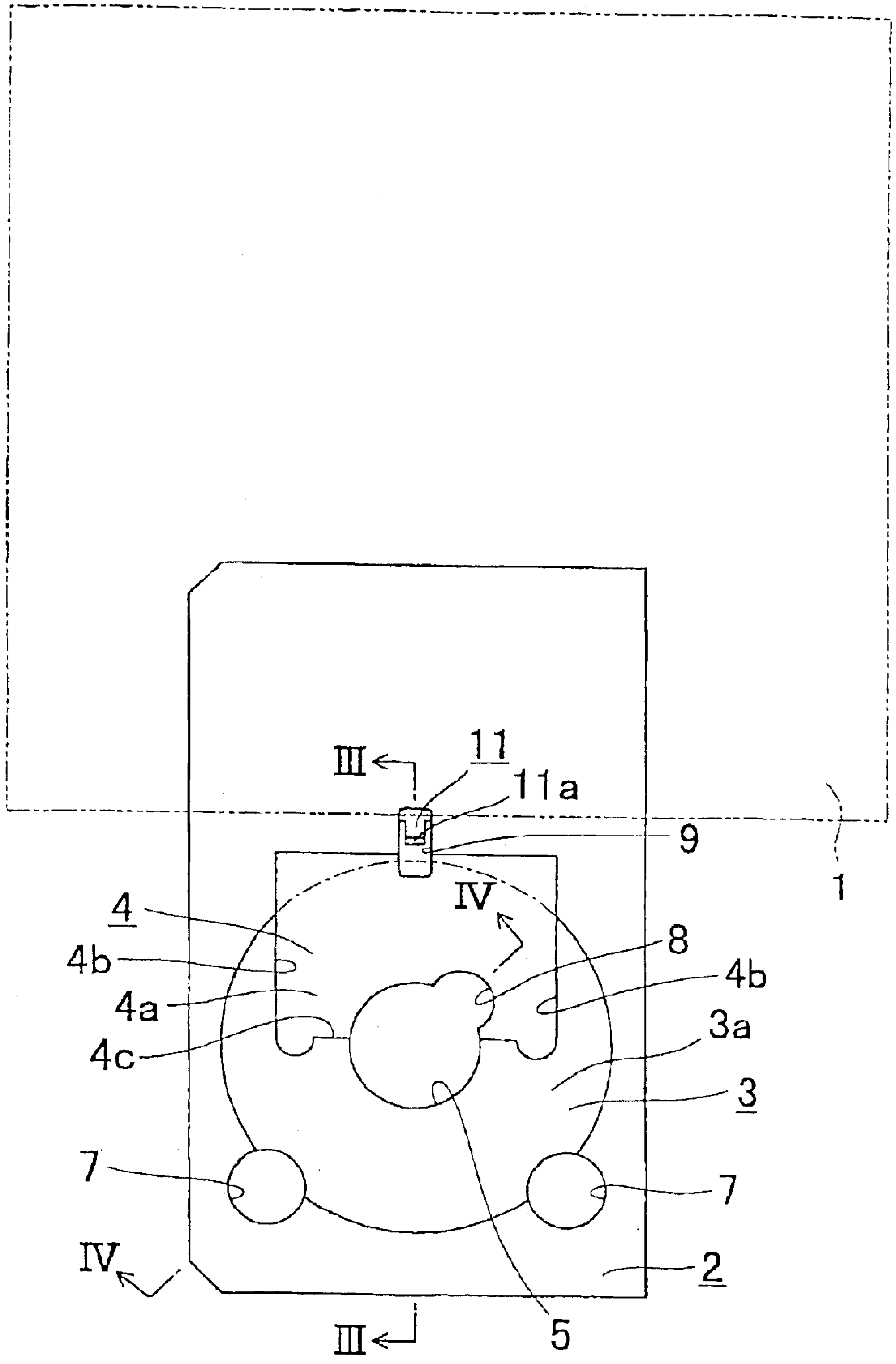
FIG. 2 is a schematic plan view showing the state in which a disk transferring tray is ejected from the printer main body.

As shown in FIG. 2, the 12 cm-diameter complete round disk loading recessed portion 3 has an inner periphery that coincides with a virtual complete circle having a diameter larger than the diameter of 12 cm by 1 mm and a bottom surface 3*a* located lower than the upper surface of the tray by about 1 mm. At the rear portion of the recessed portion 3, a name card type disk loading recessed portion 4 having a bottom surface 4*a* located lower than the bottom surface 3*a* of the 12 cm-diameter complete round disk loading recessed portion 3 is provided, so that three peripheries of the name card type disk loading recessed portion 4 constitute stepped portions 4*b*, 4*b* and 4*c* of the 12 cm-diameter complete round disk loading recessed portion 3.

Accordingly, a 12 cm-diameter complete round disk D1 loaded in the 12 cm-diameter complete round disk loading recessed portion 3 is in a state in which the portion of the disk D1 located above the name card type disk loading recessed portion 4 is not supported from beneath.

The name card type disk loading recessed portion 4 is formed into an approximately rectangular shape as seen from the above corresponding to the plan shape of the name card type disk D2 so that the long side of the rectangular recessed portion 4 and the transferring direction of the disk transferring tray 2 cross at right angles. Furthermore, the rear end edge, or the long side edge located at the rear side, is located at the vicinity of the rear most end portion of the virtual complete round circle of the complete round disk loading recessed portion 3. The inner periphery of this name card type disk loading recessed portion 4 is set to be 86 mm×61 mm so that a name card type disk D2 of about 86 mm× about 59 mm can be loaded in a state in which the name card type disk D2 is disposed tightly in the recessed portion 4 in the longitudinal direction but loosely in the widthwise direction.

Furthermore, at the rear portion of this name card type disk loading recessed portion 4, an aperture 9 for allowing the movement of the disk holding member 11 in the fore-and-aft direction of the printer body 1 is formed so as to communicate with the upper surface of the tray.

Figure 9:
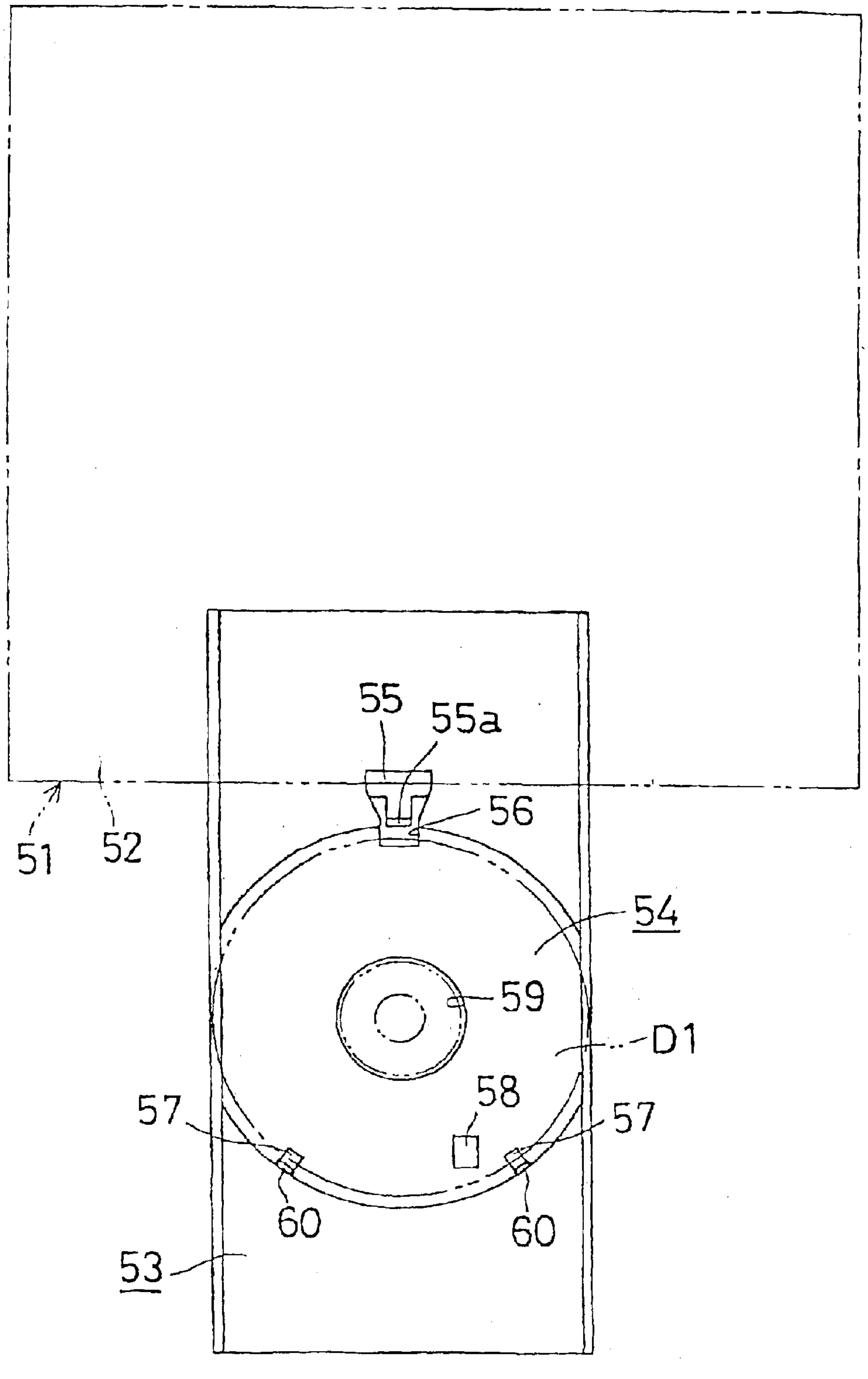
Fig. 9 PRIOR ART
FIG. 9 is a schematic explanatory view showing the state in which a disk transferring tray is ejected from a conventional label printer.
Figure 10:
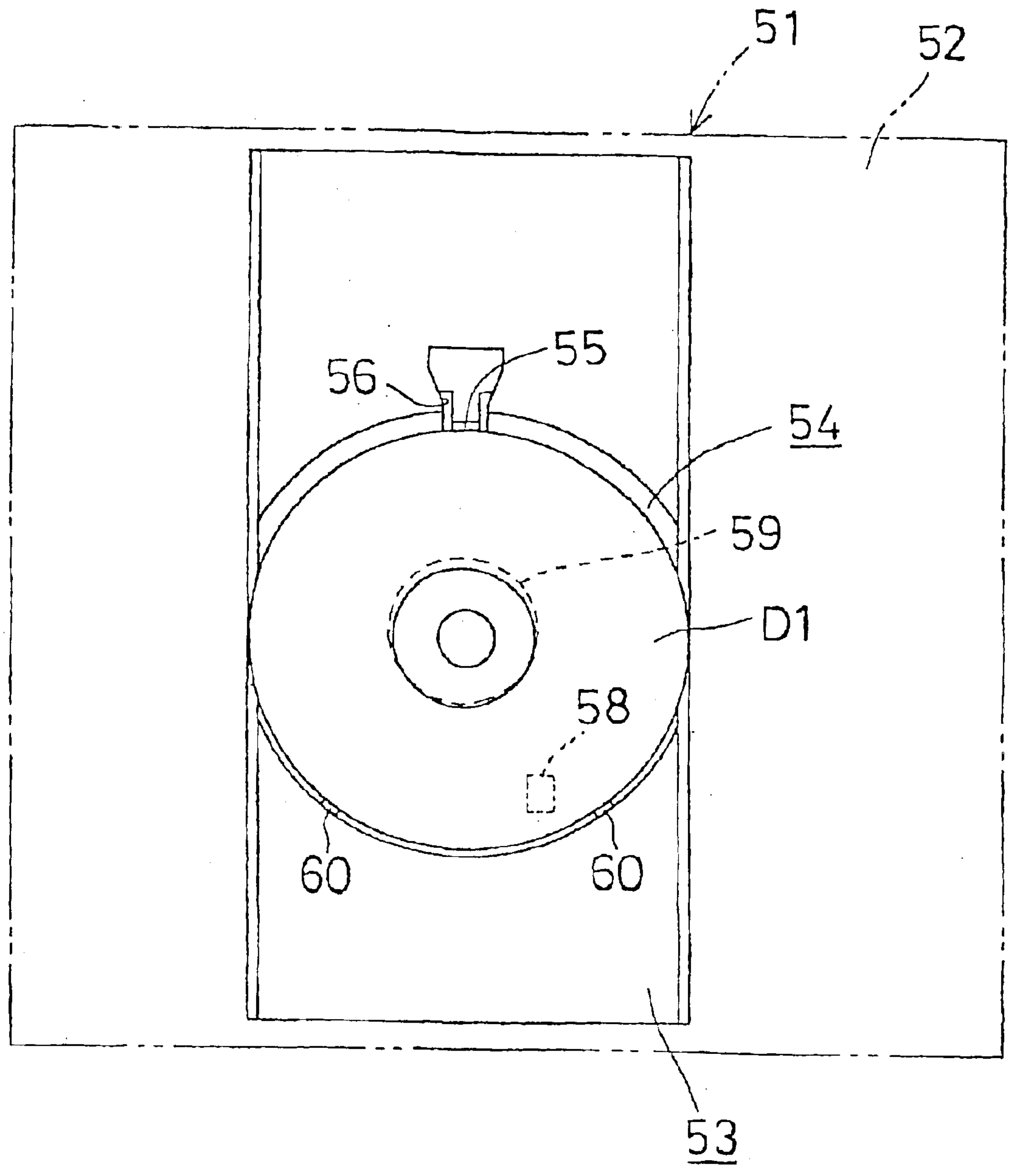
Fig. 10 PRIOR ART
FIG. 10 is a schematic explanatory view showing the state in which a disk transferring tray is inserted in a conventional label printer.

In the same manner as the conventional disk holding means 55 shown in FIGS. 9 and 10, the disk holding means 11 works with the disk transferring tray 2 such that the disk holding means 11 moves toward the releasing direction at the time of ejecting the disk transferring tray 2 from the printer body 1 and toward the holding direction at the time of inserting the disk transferring tray 2 into the printer body 1. The detailed explanation will be omitted.

Figure 3:
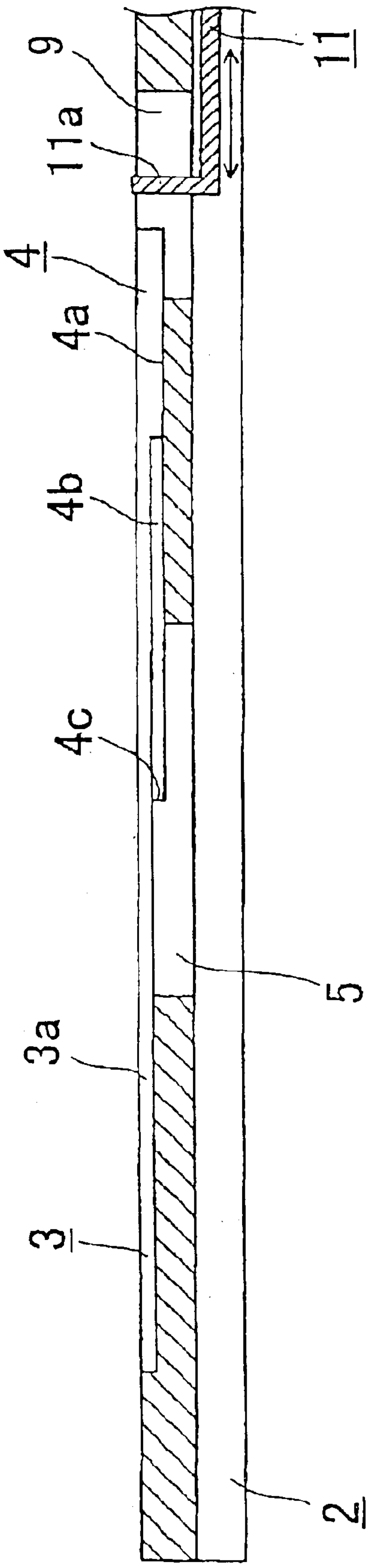
FIG. 3 is an enlarged end elevation taken along the lines III—III in FIG. 2.
Figure 4:
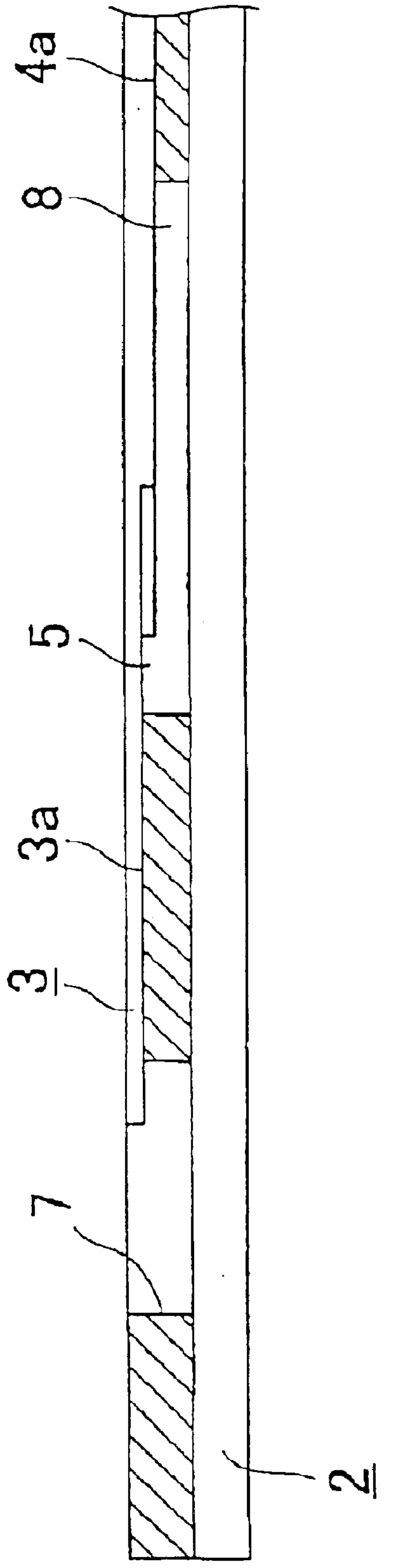
FIG. 4 is an enlarged end elevation taken along the lines IV—IV in FIG. 2.
Figure 5:
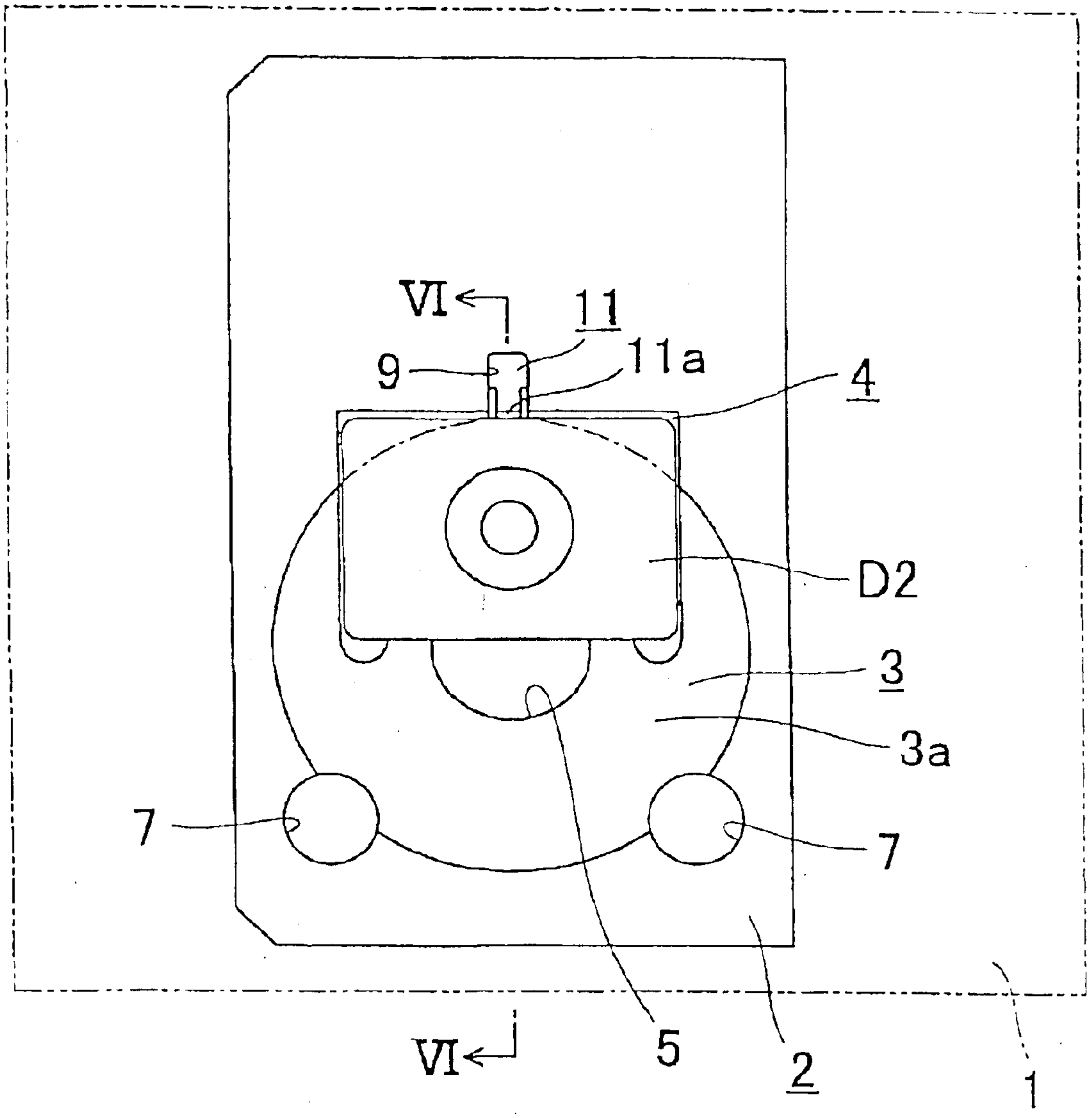
FIG. 5 is a schematic plan view showing the state in which a disk transferring tray with a name card type CD loaded in a name card type disk loading recessed portion is inserted in the printer main body.
Figure 6:
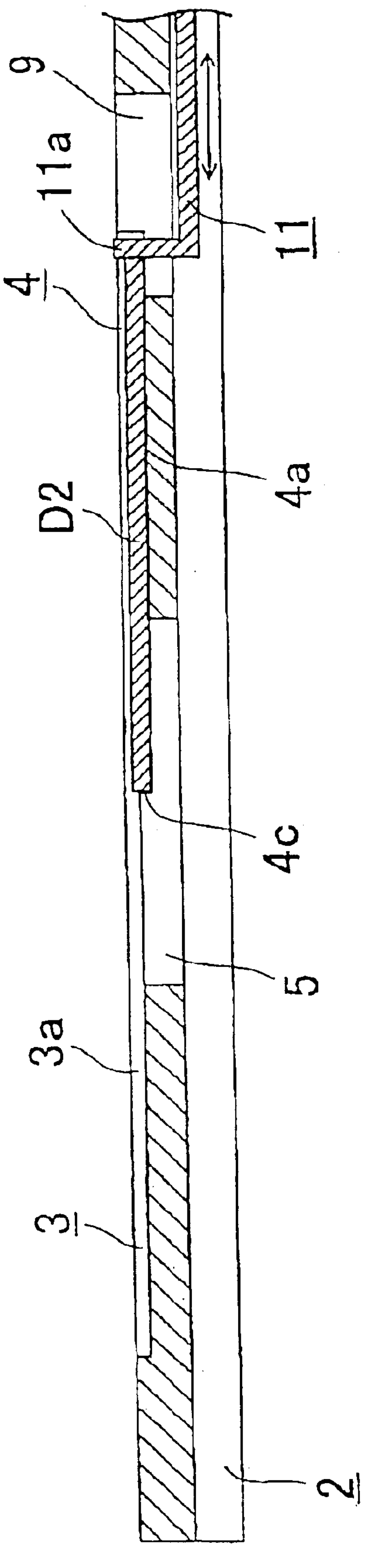
FIG. 6 is an end elevation taken along the lines VI—VI in FIG. 5.
Figure 7:
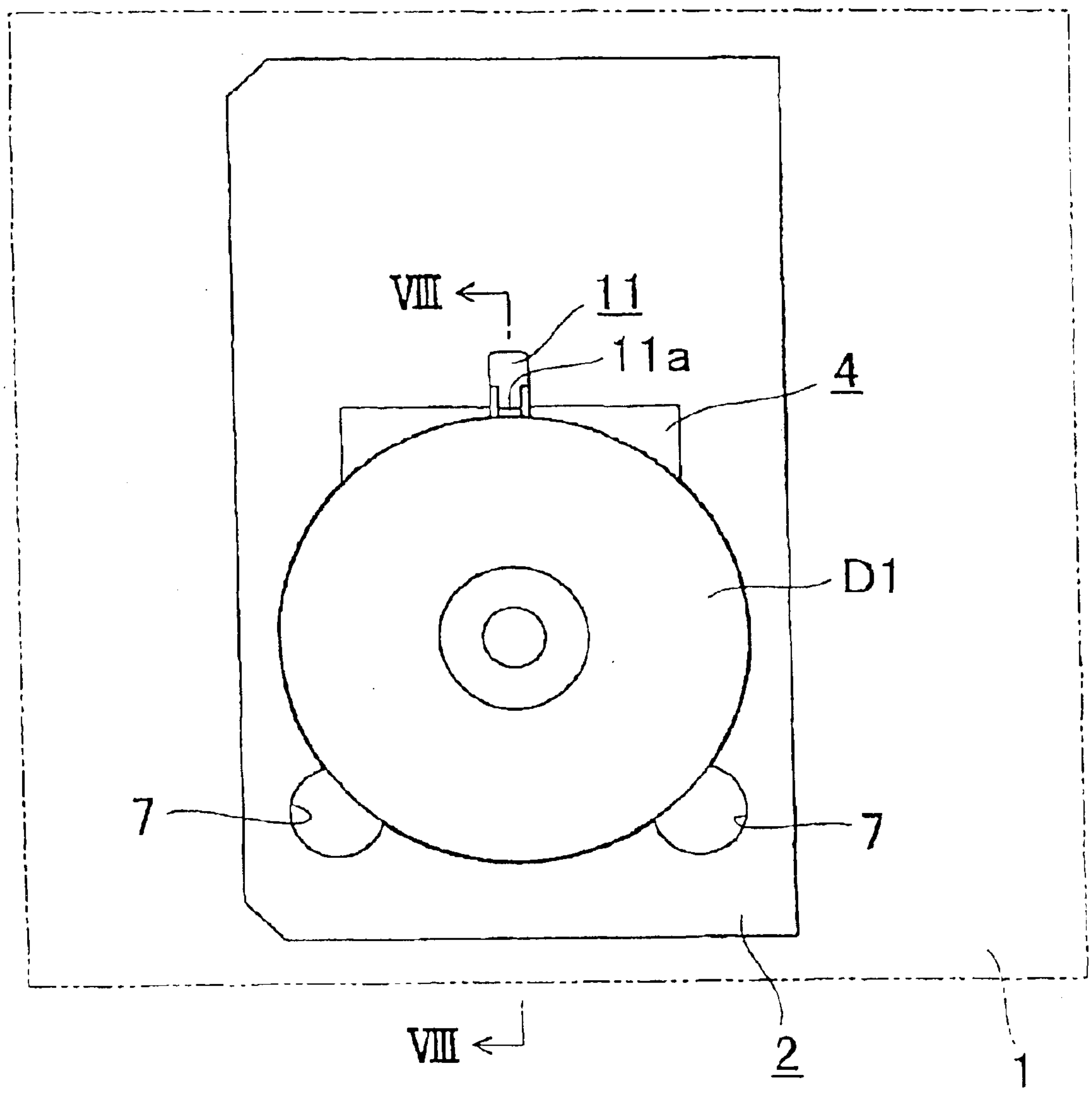
FIG. 7 a schematic plan view showing the state in which a disk transferring tray with a 12 cm-diameter CD loaded in a complete round disk loading recessed portion is inserted in the printer main body.
Figure 8:
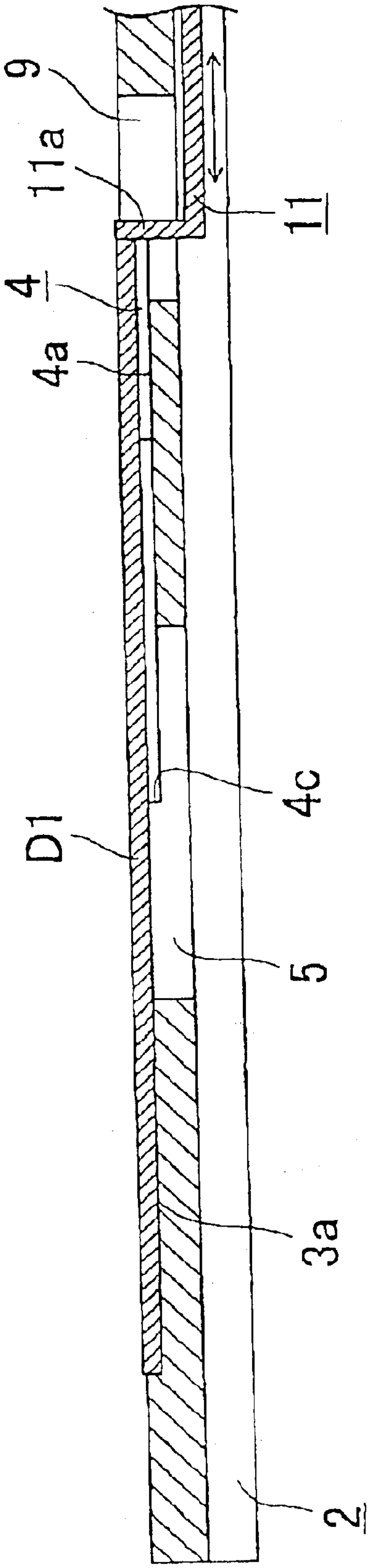
FIG. 8 is an end elevation taken along the lines VIII—VIII in FIG. 7.

As shown in FIG. 3, etc., this disk holding means 11 is provided with a protrusion 11*a* at the tip end thereof, so that the protrusion 11*a* can move in the aperture 9 in the fore-and-aft direction of the printer body 1 in a state in which the protrusion 11*a* is always disposed in the aperture 5.

At the central portion of the bottom surface 3*a* of the complete round disk loading recessed portion 3, a disk ejecting finger insertion aperture 5 is formed. This disk ejecting finger insertion aperture 5 is also communicated with the bottom surface 4*a* of the name card type disk loading recessed portion and has an approximately round shape as seen from the above. Furthermore, a sensor window 8 is also formed so as to communicate with the disk ejecting finger insertion aperture 5 formed in the bottom surface 4*a* of the name card type disk loading recessed portion 5. This sensor window 8 will be located right above a sensor (not shown) disposed in the printer body 1 when the disk transferring tray 11 is inserted into the printer body 1.

Furthermore, at the vicinity of the periphery of the 12 cm-diameter complete round disk loading recessed portion 3, a disk ejecting finger insertion apertures 7 each communicating with the bottom surface 3*a* of the complete round disk loading recessed portion 3 are formed.

The printer body 1 is provided with an ink head (not shown) like a conventional label printer 51. The sensor discriminates whether a disk is loaded on the disk transferring tray 2. When the sensor confirms that a disk is loaded on the disk transferring tray, label printing by the ink head will be executed automatically. After the completion of the printing, the disk transferring tray 2 is automatically ejected from the printer body 1.

As will be understood from the above explanation, the printer A having the aforementioned structure can be used as follows. A predetermined label printing can be performed by loading a 12 cm-diameter complete round disk D1 or a name card type disk D2 in the corresponding disk loading recessed portion 3, 4 of the disk transferring tray 2 and then inserting the disk transferring tray 2 in the printer body 1.

In detail, when a 12 cm-diameter complete round disk D1 or a name card type disk D2 is loaded in the corresponding disk loading recessed portion 3, 4 of the disk transferring tray 2 and then the disk transferring tray 2 is inserted in the printer body 1, the disk holding means 11 moves in the disk holding direction in accordance with the movement of the disk transferring tray 2 to press the 12 cm-diameter complete round disk D1 or the name card type disk D2 against the inner periphery of the corresponding disk loading recessed portion 3, 4, thereby immovably holding the disk.

When the sensor mounted in the printer body 1 confirms the loading of the disk, printing by the ink head is initiated. Since this printing is performed in a state in which the disk D1 or D2 is immovably held, a favorable label printing with no blur can be performed.

After the completion of the label printing, when the disk transferring tray 2 is automatically ejected from the printer body 1, the disk holding means 11 retreats from the disk holding position. Thus, the 12 cm-diameter complete round disk D1 or the name card type disk D2 is released from the holding state in the corresponding recessed portion 3, 4 by the disk holding means 11. Therefore, the 12 cm-diameter complete round disk D1 or the name card type disk D2 can be easily picked up from the disk transferring tray 2 by inserting a finger into the disk ejecting finger insertion aperture 5 or 7 corresponding to the 12 cm-diameter complete round disk D1 or the name card type disk D2.

What is claimed is:

1. A label printer for an optical disk such as a CD, comprising a disk transferring tray with a 12 cm-diameter complete round disk loading recessed portion, the disk transferring tray being able to be inserted into and ejected from a printer body, and a disk holding means that holds an optical disk such as a CD in the 12 cm-diameter complete round disk loading recessed portion by pressing the optical disk, characterized in that:

a name card type disk loading recessed portion is formed in the tray, and a name card type disk loaded in the name card type disk loading recessed portion is pressed against an inner periphery of the name card type disk loading recessed portion by the disk holding means to immovably hold the disk, wherein the disk holding means serves both as a disk holding means for holding the name card type disk D2 in the name card type disk loading recessed portion and a disk holding means for holding a 12 cm-diameter complete round disk in the 12 cm-diameter complete round disk loading recessed portion.

2. The label printer for an optical disk such as a CD as recited in claim 1, wherein the name card type disk loading recessed portion is formed at a rear portion of the complete round disk loading recessed portion, and wherein a bottom surface of the recessed portion is positioned lower than a bottom surface of the complete round disk loading recessed portion.

3. The label printer for an optical disk such as a CD as recited in claim 2, wherein a disk ejecting finger insertion aperture communicating with the complete round disk loading recessed portion is formed in the vicinity of a periphery of the complete round disk loading recessed portion.

4. The label printer for an optical disk such as a CD as recited in claim 2, wherein a disk ejecting finger insertion aperture communicating with the name card type disk loading recessed portion is formed in the complete round disk loading recessed portion.

5. The label printer for an optical disk such as a CD as recited in claim 2, wherein an aperture for allowing a movement of the disk holding means in the fore-and-aft direction of the printer body is formed at a rear portion of the name card type disk loading recessed portion.

6. The label printer for an optical disk such as a CD as recited in claim 2, wherein the name card type disk loading recessed portion is formed into an approximately rectangular shape as seen from the above corresponding to a plan shape of a name card type optical disk, and wherein the rear end edge is positioned in the vicinity of a rear most portion of a virtual complete circle of the complete round disk loading recessed portion.

7. The label printer for an optical disk such as a CD as recited in claim 6, wherein a disk ejecting finger insertion aperture communicating with the complete round disk loading recessed portion is formed in the vicinity of a periphery of the complete round disk loading recessed portion.

8. The label printer for an optical disk such as a CD as recited in claim 6, wherein a disk ejecting finger insertion aperture communicating with the name card type disk loading recessed portion is formed in the complete round disk loading recessed portion.

9. The label printer for an optical disk such as a CD as recited in claim 6, wherein an aperture for allowing a movement of the disk holding means in the fore-and-aft direction of the printer body is formed at a rear portion of the name card type disk loading recessed portion.

10. The label printer for an optical disk such as a CD as recited in claim 6, wherein the name card type disk loading recessed portion is formed such that a long side thereof and a transferring direction of the disk transferring tray cross at right angles.

11. The label printer for an optical disk such as a CD as recited in claim 10, wherein a disk ejecting finger insertion aperture communicating with the complete round disk loading recessed portion is formed in the vicinity of a periphery of the complete round disk loading recessed portion.

12. The label printer for an optical disk such as a CD as recited in claim 10, wherein an aperture for allowing a movement of the disk holding means in the fore-and-aft direction of the printer body is formed at a rear portion of the name card type disk loading recessed portion.

13. The label printer for an optical disk such as a CD as recited in claim 10, wherein a disk ejecting finger insertion aperture communicating with the name card type disk loading recessed portion is formed in the complete round disk loading recessed portion.

14. The label printer for an optical disk such as a CD as recited in claim 1, wherein an aperture for allowing a movement of the disk holding means in the fore-and-aft direction of the printer body is formed at a rear portion of the name card type disk loading recessed portion.

15. The label printer for an optical disk such as a CD as recited in claim 14, wherein a disk ejecting finger insertion aperture communicating with the name card type disk loading recessed portion is formed in the complete round disk loading recessed portion.

16. The label printer for an optical disk such as a CD as recited in claim 14, wherein a disk ejecting finger insertion aperture communicating with the complete round disk loading recessed portion is formed in the vicinity of a periphery of the complete round disk loading recessed portion.

17. The label printer for an optical disk such as a CD as recited in claim 1, wherein a disk ejecting finger insertion aperture communicating with the name card type disk loading recessed portion is formed in the complete round disk loading recessed portion.

18. The label printer for an optical disk such as a CD as recited in claim 17, wherein a disk ejecting finger insertion aperture communicating with the complete round disk loading recessed portion is formed in the vicinity of a periphery of the complete round disk loading recessed portion 3.

19. The label printer for an optical disk such as a CD as recited in claim 1, wherein a disk ejecting finger insertion aperture communicating with the complete round disk loading recessed portion is formed in the vicinity of a periphery of the complete round disk loading recessed portion.

* * * * *